US008593829B2

(12) United States Patent
Li

(10) Patent No.: US 8,593,829 B2
(45) Date of Patent: Nov. 26, 2013

(54) CABLE MANAGEMENT APPARATUS

(75) Inventor: Zhan-Yang Li, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 315 days.

(21) Appl. No.: 13/204,967

(22) Filed: Aug. 8, 2011

(65) Prior Publication Data

US 2012/0152868 A1 Jun. 21, 2012

(30) Foreign Application Priority Data

Dec. 15, 2010 (CN) .......................... 2010 1 0589236

(51) Int. Cl.
*H02G 3/04* (2006.01)
*H02B 1/015* (2006.01)
*H02G 3/00* (2006.01)

(52) U.S. Cl.
CPC ........... *H02G 3/0406* (2013.01); *H02G 3/0437* (2013.01); *H02G 3/263* (2013.01)
USPC ............................ 361/826; 174/97; 312/223.6

(58) Field of Classification Search
CPC ..... H02G 3/04; H02G 3/0437; H02G 3/0406; H02G 3/263; H02G 5/02; H02G 5/04; H02B 1/20; H02B 1/01; H02B 1/015
USPC .................... 361/826; 312/223.6; 174/95, 97; 439/207, 209, 211
See application file for complete search history.

(56) References Cited

U.S. PATENT DOCUMENTS

| | | | | |
|---|---|---|---|---|
| 4,296,981 A | * | 10/1981 | Hildebrandt et al. | 312/194 |
| 5,023,404 A | * | 6/1991 | Hudson et al. | 174/97 |
| 5,401,905 A | * | 3/1995 | Lesser et al. | 174/99 R |
| 5,853,236 A | * | 12/1998 | Rogers et al. | 312/223.6 |
| 6,347,714 B1 | * | 2/2002 | Fournier et al. | 211/26 |
| 6,350,135 B1 | * | 2/2002 | Acklin et al. | 439/211 |
| 6,403,885 B1 | * | 6/2002 | Baker et al. | 174/68.3 |
| 6,655,643 B1 | * | 12/2003 | Hoyl et al. | 248/68.1 |

(Continued)

FOREIGN PATENT DOCUMENTS

| | | | | | |
|---|---|---|---|---|---|
| JP | 2008178251 A | * | 7/2008 | | H02G 3/04 |
| JP | 2009185934 A | * | 8/2009 | | F16B 5/06 |
| JP | 2010114995 A | * | 5/2010 | | H02G 3/04 |
| JP | 2011030359 A | * | 2/2011 | | H02G 3/04 |
| JP | 2011109826 A | * | 6/2011 | | H02G 3/04 |
| JP | 2011151938 A | * | 8/2011 | | H02G 3/04 |

(Continued)

*Primary Examiner* — Michael Safavi
(74) *Attorney, Agent, or Firm* — Altis & Wispro Law Group, Inc.

(57) ABSTRACT

A cable management apparatus includes a securing board and a cable management tray. The securing board includes three clipping pieces located along a straight line. A clasping portion extends from the securing board and includes a connecting flange and a clasping flange. The connecting flange is substantially perpendicular to the clasping flange and the securing board. The cable management tray defines a first receiving space for receiving a first cable and a second receiving space for receiving a second cable. The cable management tray includes two handles and three securing tabs. The two handles are elastic and engaged with the clasping flange, for preventing the cable management tray from moving along a direction substantially parallel to the securing board. The three securing tabs are engaged with the three clipping pieces, for preventing the cable management tray from moving along a direction substantially perpendicular to the securing board.

20 Claims, 4 Drawing Sheets

(56) References Cited

U.S. PATENT DOCUMENTS

| | | | |
|---|---|---|---|
| 6,848,854 B2 * | 2/2005 | Masse | 403/329 |
| 6,883,879 B2 * | 4/2005 | Latchinian | 312/140 |
| 7,097,047 B2 * | 8/2006 | Lee et al. | 211/26.2 |
| 7,191,713 B2 * | 3/2007 | Gayhart et al. | 108/50.02 |
| 7,637,771 B2 * | 12/2009 | Laursen | 439/501 |
| 7,963,486 B2 * | 6/2011 | Wilson et al. | 248/49 |
| 7,975,624 B2 * | 7/2011 | Henriott | 108/50.02 |

FOREIGN PATENT DOCUMENTS

| | | | | |
|---|---|---|---|---|
| JP | 2012167736 A | * | 9/2012 | H02G 3/04 |
| JP | 2012228086 A | * | 11/2012 | H02G 3/04 |

* cited by examiner

CABLE MANAGEMENT APPARATUS

BACKGROUND

1. Technical Field

The present disclosure relates to cable management apparatuses, and more particularly to a cable management apparatus used in an electronic device.

2. Description of Related Art

Many electronic devices, such as computers, need multiple cables. The cables may include for example, power cables, data cables, communication lines, or keyboard lines. Therefore it is desirable to include some type of cable management apparatus, such as a binding accessory that allows the various cables to be collected together and attached in a position to improve the use of space and the ease of visual examination inside an electronic device. However, the conventional binding accessory is not suited for temporary use in securing cables, and often there is a need to replace or re-route the cables.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
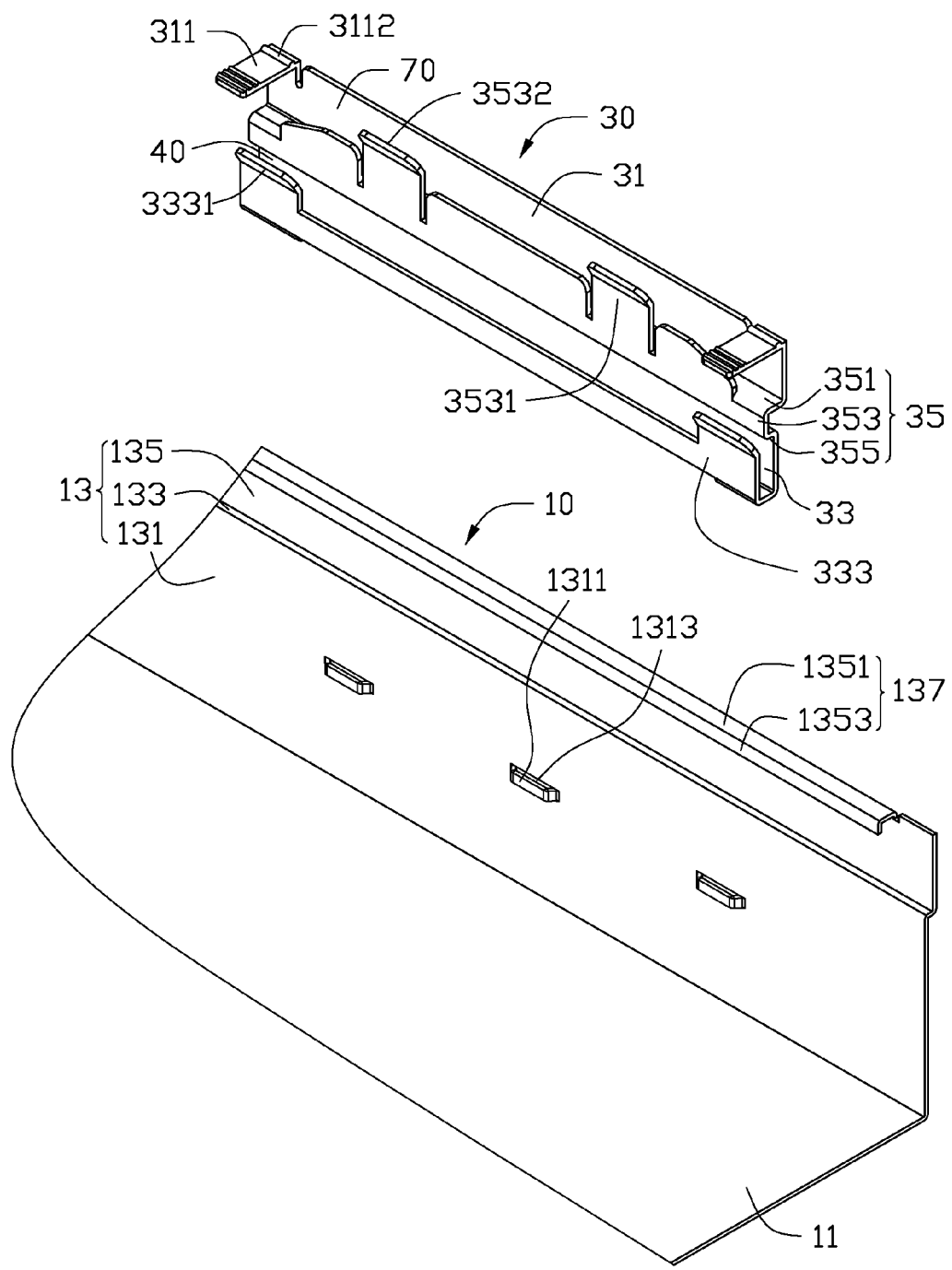
FIG. 1 is an isometric, exploded view of an embodiment of a cable management apparatus.
Figure 2:
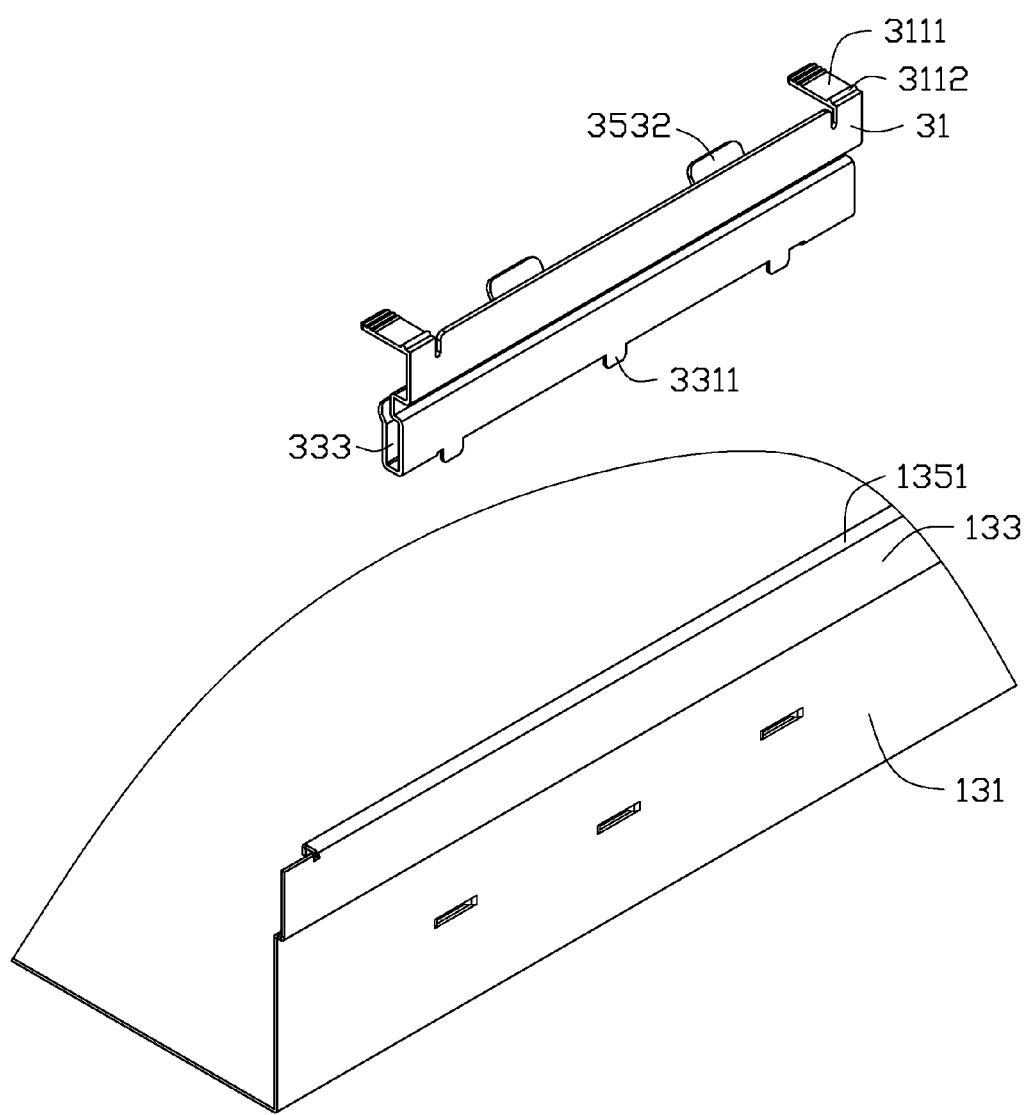
FIG. 2 is similar to FIG. 1, but viewed from another aspect.

Referring to FIGS. 1 and 2, a cable management apparatus in accordance with an embodiment includes a securing board 13 and a cable management tray 30 mounted to the securing board 13. In one embodiment, the cable management tray 30 is integrated formed, not by jointing or screw. the securing board 13 may be a side plate of an electronic device enclosure (enclosure 10), and the cable management tray 30 receives a first cable 60 and a second cable 50 (see FIG. 3).

The enclosure 10 includes a bottom plate 11, and the securing board 13 is connected to the bottom plate 11. The securing board 13 has a first securing portion 131, a connecting portion 133 extending from the first securing portion 131, and a second securing portion 135 extending from connecting portion 133. Three clipping pieces 1311 protrudes from the inner side of the first securing portion 131, and a gap 1313 is defined between each clipping piece 1311 and the first securing portion 131. The three clipping pieces 1311 are arranged along a straight line. In one embodiment, the connecting portion 133 is substantially perpendicular to the first securing portion 131 and the second securing portion 135.

A clasping portion 137 includes a connecting flange 1351 and a clasping flange 1353 and extends from the top edge of the second securing portion 135. In one embodiment, the connecting flange 1351 is substantially perpendicular to the second securing portion 135 and the clasping flange 1353, and the clasping flange 1353 is aimed at the bottom plate 11.

The cable management tray 30 includes a first management plate 31, a second management plate 33, and a coupling portion 35 located between the first management plate 31 and the second management plate 33. In one embodiment, the second management plate 33 is substantially parallel to the first management plate 31. Two handles 311 extend from the top edge of the first management plate 31, and each handle 311 has a ridge 3112 protruding thereon. Three securing tabs 3311 extends from the bottom edge of the second management plate 33, corresponding to the three clipping pieces 1311. An extending piece 333 extends from the second management plate 33, and has two first operating pieces 3331. In one embodiment, the extending piece 333 is H-shaped.

The coupling portion 35 includes a first coupling panel 351 coupling with the first management plate 31, a second coupling panel 355 coupling with the second management plate 33, and a third coupling panel 353 coupling with the first and second coupling panels 351, 355. A plurality of stopper panels 3531 extends upward from the third coupling panel 353, and two second operating pieces 3532 are located between the plurality of stopper panels 3531. The first management plate 31, the first coupling panel 351, and the plurality of stopper panels 3531 cooperatively define a first receiving space 70. The second management plate 33, the second coupling panel 355, and the extending piece 333 cooperatively define a second receiving space 40. In one embodiment, the plurality of stopper pieces 3531 is integrated with the third coupling panel 353, and substantially parallel to the first management plate 31.

Figure 3:
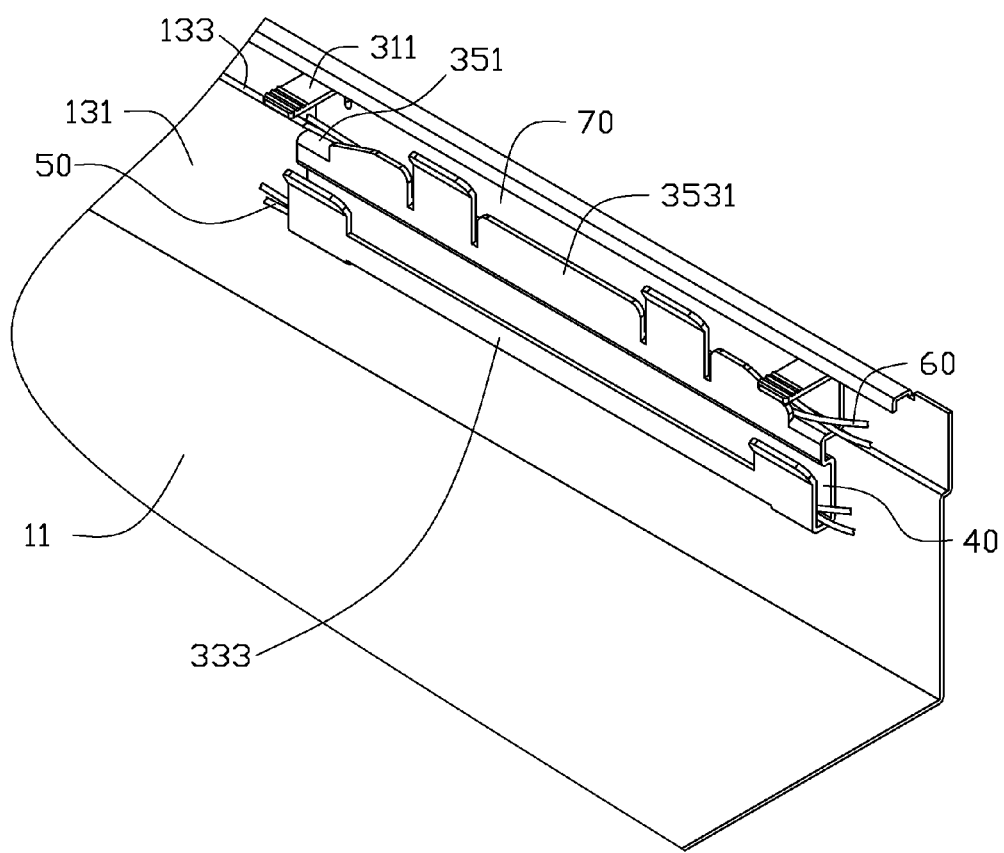
FIG. 3 is an assembled view of FIG. 1.
Figure 4:
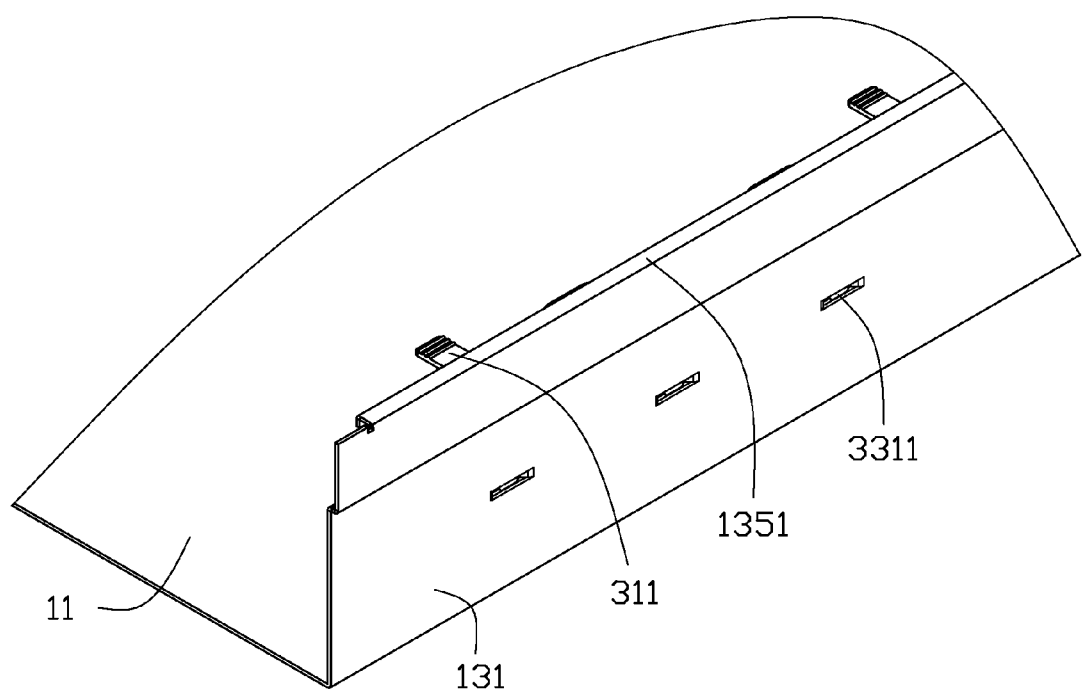
FIG. 4 is an assembled view of FIG. 2.

Referring to FIGS. 3 and 4, in assembly, the cable management tray 30 abuts the inside of the securing board 13. The three securing tabs 3311 align with the three clipping piece 1311. The cable management tray 30 moves towards the bottom plate 11, and the three securing tabs 3311 are thus engaged with the clipping piece 1311. The first management plate 31 abuts the clasping flange 1353. The two handles 311 are pressed to deform, and the ridges 3112 can be clipped to the clasping flange 1353. Then, the first coupling panel 351 abuts against a top surface of the connecting portion 133. Therefore, the cable management tray 30 is secured into the securing board 13.

When the first cable 60 needs to be received in the cable management tray 30, the plurality of stopper panel 3531 operates outwards relative to the first receiving space 70, to deform the plurality of stopper panel 3531. The first cable 60 is placed between the plurality of stopper panel 3531 and the first management plate 31. The plurality of stopper panel 3531 is released, and the first cable 60 is thus received in the first receiving space 70. In one embodiment, the extending direction of the first cable 60 is substantially parallel to the securing board 13.

When the second cable 50 needs to be received in the cable management tray 30, the two first operating pieces 3331 are operates outwards relative to the second receiving space 40, to deform the extending piece 333. The second cable 50 is placed between the extending piece 333 and the second management plate 33. The extending piece 333 is release, and the second cable 50 is thus received in the second receiving space 40. In one embodiment, the extending direction of the second cable 50 is same as the extending direction of the first cable 60, substantially parallel to the securing board 13.

When the first cable 60 needs to be removed from the first receiving space 70, the two second operating pieces 3532 are deformed outwards relative to the first receiving space 70.

Thus, the first cable 60 can be detached from the first receiving space 70. When the second cable 50 needs to be removed from the second receiving space 40, the two first operating pieces 3331 are deformed outwards relative to the second receiving space 40. Thus, the second cable 50 can be detached from the second receiving space 40.

When the cable management tray 30 needs to be detached from the securing board 13, the two handles 311 are operated to deform, to disengage the ridges 3112 from the clasping flange 1353. The cable management tray 30 is moved upward, to remove the three securing tabs 3311 from the three clipping pieces 1311. Therefore, the cable management tray 30 can be detached from the securing board 13.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A cable management apparatus, comprising:
   a securing board comprising a clipping piece, a clasping portion, extending from the securing board, comprising a connecting flange and a clasping flange, the connecting flange is substantially perpendicular to the clasping flange and the securing board; and
   a cable management tray defining a first receiving space and a second receiving space, the cable management tray comprising two handles and a securing tab;
   wherein the two handles are elastic and engaged with the clasping flange, and the securing tab is engaged with the clipping piece.

2. The cable management apparatus of claim 1, wherein a ridge is located on each handle and engaged with the clasping flange.

3. The cable management apparatus of claim 1, wherein an extending direction of the receiving space is substantially parallel to the securing board.

4. The cable management apparatus of claim 1, wherein the cable management tray comprises a first management plate, and each handle extends from the first management plate and is substantially perpendicular to the first management plate.

5. The cable management apparatus of claim 4, wherein the cable management tray further comprises a second management plate, and the securing tab extends from a bottom edge of the second management plate.

6. The cable management apparatus of claim 5, wherein the cable management tray further comprises a coupling portion located between the first management plate and the second management plate, and a plurality of stopper pieces extends from the coupling portion.

7. The cable management apparatus of claim 6, wherein the coupling portion comprises a first coupling panel that is substantially perpendicular to the first management plate, and the first coupling panel, and the first management plate and plurality of stopper pieces cooperatively defines the first receiving space.

8. The cable management apparatus of claim 7, wherein the coupling portion further comprises a second coupling panel, an extending piece extends from the second management plate, and the extending piece, the second coupling panel, and the second management plate cooperatively define the second receiving space.

9. The cable management apparatus of claim 8, wherein the coupling portion further comprises a third coupling panel located between the first coupling panel and the second coupling panel, and the plurality of stopper pieces is integrated with the third coupling panel.

10. The cable management apparatus of claim 8, wherein the cable management tray is integrally formed.

11. A cable management apparatus, comprising:
    a securing board; and
    a cable management tray, attached to the securing board, comprising a first management plate, a second management plate, and a coupling portion located between the first management plate and the second management plate; a plurality of stopper pieces located on the coupling portion, and an extending piece located on the second management plate; and the coupling portion comprising a first coupling panel and a second coupling panel that is substantially parallel to the first coupling panel;
    wherein the first coupling panel, the first management plate and the plurality of stopper pieces cooperatively define a first receiving space; and the second coupling panel, the second management plate, and the extending piece cooperatively define a second receiving space.

12. The cable management apparatus of claim 11, wherein the plurality of stopper pieces is substantially parallel to the first management plate.

13. The cable management apparatus of claim 11, wherein an extending direction of the first receiving space is substantially parallel to the securing board.

14. The cable management apparatus of claim 11, wherein the securing board comprises a first securing portion, a second securing portion, and a connecting portion located between the first securing portion and the second securing portion, and the first coupling panel abuts the connecting portion.

15. The cable management apparatus of claim 14, wherein a clasping portion is located on the second securing portion, two handles extend from the first management plate, and the two handles are elastic and engaged with the clasping portion.

16. The cable management apparatus of claim 15, wherein the clasping portion comprises a clasping flange, and a ridge is located on each handle and engaged with the clasping flange.

17. The cable management apparatus of claim 15, wherein each handle is substantially perpendicular to the first management plate.

18. The cable management apparatus of claim 14, wherein a clipping piece is located on the first securing portion, and a securing tab, extending from a bottom edge of the second management plate, is engaged with the clipping piece.

19. The cable management apparatus of claim 11, wherein the coupling portion further comprises a third coupling panel located between the first coupling panel and the second coupling panel, and the plurality of stopper pieces is integrated with the third coupling panel.

20. The cable management apparatus of claim 11, wherein the cable management tray is integrally formed.

* * * * *